United States Patent
Sensabaugh

[11] Patent Number: 5,908,008
[45] Date of Patent: Jun. 1, 1999

[54] RECIRCULATING WATERING SYSTEM

[76] Inventor: Glenn C. Sensabaugh, HCR-32 Box 128-C, Staunton, Va. 24401

[21] Appl. No.: 08/971,354

[22] Filed: Nov. 17, 1997

[51] Int. Cl.[6] .................................................. A01K 7/04
[52] U.S. Cl. ............................................. 119/80; 119/73
[58] Field of Search ................................ 119/73, 79, 80; 137/409

[56] References Cited

U.S. PATENT DOCUMENTS

| | | | |
|---|---|---|---|
| 3,221,706 | 12/1965 | Johnson | 119/73 |
| 3,306,263 | 2/1967 | Johnson | 119/73 |
| 4,068,116 | 1/1978 | McKinstry | 219/523 |
| 4,248,177 | 2/1981 | Peterson et al. | 119/73 |
| 4,269,147 | 5/1981 | Vorbeck | 119/73 |
| 4,584,966 | 4/1986 | Moore | 119/73 |
| 4,704,991 | 11/1987 | Moore | 119/73 |
| 4,813,378 | 3/1989 | Lapp | 119/73 |
| 5,003,928 | 4/1991 | Ketterlin et al. | 119/73 |
| 5,146,873 | 9/1992 | Gray | 119/73 |
| 5,156,113 | 10/1992 | Sextro | 119/73 |
| 5,345,063 | 9/1994 | Reusche et al. | 219/441 |
| 5,452,683 | 9/1995 | Poffenroth | 119/73 |
| 5,474,029 | 12/1995 | Hofer | 119/73 |
| 5,813,363 | 9/1998 | Snelling | 119/73 |

*Primary Examiner*—Jack W. Lavinder
*Assistant Examiner*—Yvonne R. Abbott

[57] ABSTRACT

A recirculating livestock watering system provides drinking water at a temperature above the freezing point during the winter and below the ambient air temperature during the summer. The reservoir, having a bottom surface, a continuous side surface, and an upper rim surface, is disposed such that the bottom surface and a portion of the side surface lie underground. A water source is disposed underground at a depth below the frost line. A heating circuit includes a coil, a pump, an input valve, and a output valve. The coil has an inlet and an outlet and is placed below the frost line. The pump inlet is connected to the coil outlet and the pump outlet is connected to the coil inlet, forming a continuous enclosed path. The output valve releases water from the heating circuit into the reservoir upon demand and is disposed along the continuous enclosed path downstream from the coil outlet and upstream from the pump inlet. The input valve is connected to the water source upstream from the coil inlet and downstream from the pump outlet permitting water to enter and fill the heating circuit under predetermined conditions.

18 Claims, 3 Drawing Sheets

RECIRCULATING WATERING SYSTEM

BACKGROUND OF THE INVENTION

1. Field of the Invention

The present invention relates to the provision of drinking water for animals, and more particularly to devices for maintaining a constant supply of water which remains: 1) free of debris or other contaminants during operation, 2) above the freezing temperature during the winter months, and 3) below the ambient air temperature during the summer months.

2. Brief Description of the Prior Art

For many years, owners of cattle and other livestock have sought an economical and practical solution to providing sources of fresh water to their herds during the winter months. Even today, water continues to play a central role in the diet of all healthy animals. Once the ambient air temperature drops below freezing, any source of water directly exposed to the elements begins to freeze. The consequences resulting from a frozen water source range from the mere nuisance of having to periodically attend to the source to the more catastrophic outcome of losing an entire herd in the event that another source cannot be provided for an extended period.

Since these consequences are well known to those in the art, many attempts to solve the related problems have been implemented. In milder climates that experience only an occasional period of subfreezing temperatures, insulated containers or electric heating elements provide an adequate solution. In harsher climates or in situations in which water supplies cannot be attended to as frequently, however, insulated containers alone eventually freeze over and providing sufficient heating through use of an electric element becomes prohibitively expensive.

Accordingly, various heat exchange devices have been designed to harness the naturally occurring potential which results because of the differential between the subfreezing air temperature and the constant temperature of the earth below the frostline. (In most colder climates in the United States, the frostline is between two to three feet below the surface of the earth.) At some distance below the earth's surface and below the frostline in the region, the temperature remains constant at approximately 54° F., regardless of the ambient air temperature above ground. During periods of subfreezing air temperatures, this source of heat from below ground can be used to maintain a water supply at a temperature above freezing.

Numerous systems attempting to harness this subsurface heat have been disclosed. Some of these systems operate on a mechanically induced recirculation principle. In general, as disclosed in U.S. Pat. No. 3,221,706, issued to Johnson on Dec. 7, 1965 and entitled "Circulating Live-stock Watering System", these systems feature an underground pressurized water supply line that feeds into the bottom of a tank situated below the frost line. During operation, a float control system senses the level of the water within the tank and, if necessary, triggers the water supply line to begin feeding the tank. A continuously operating electric pump circulates water through a circuit. In the first portion of the circuit, water in the tank is first drawn upward through an inlet line and then enters a drinking basin disposed above the surface of the ground through a basin inlet. The basin inlet is disposed near the bottom of the basin. Water entering the basin agitates the residual pool of water there, thus slowing the freezing process. (Additionally, this agitation supposedly inhibits the growth of algae during the summer months.) If the level of the residual pool has fallen below a predetermined height, the entering water begins to fill the basin. Once the predetermined level is reached, however, the entering water flows out through the basin outlet and begins returning to the tank through via a return conduit, thereby completing the circuit. Consequently, water drawn from the pressurized supply line into the tank remains in circulation between the tank and the basin until the water is consumed or it evaporates.

Since the basin outlet is necessarily disposed at a height greater than the basin inlet, water in the basin could flow in a reverse direction and drain back into to the tank via the inlet line in the event of a pump failure. Because the basin inlet is disposed near the bottom of the basin, any sediment or other undesirable foreign matter in the basin would then be carried by the draining water into the tank, thereby increasing the likelihood of contamination. An attempt to address this drawback appeared in U.S. Pat. No. 3,306,263, issued to Johnson on Feb. 28, 1967 and entitled "Recirculating Live-stock Watering System". The Johnson '263 patent discloses a basin inlet disposed well above the basin outlet.

As disclosed in U.S. Pat. No. 4,584,966, issued to Moore on Aug. 29, 1986 and entitled "Livestock Watering System", the same recirculating system can be configured to supply relatively warmer water during the colder months and relatively colder water during the warmer months by using a selectively activated thermostatic control system. This system circulates water from the tank to the basin as the temperature of the residual pool either increases or decreases from a predetermined setting.

Instead of continuously circulating the water, other systems provide for supplying it upon demand. For example, as disclosed in U.S. Pat. No. 4,813,378, issued to Lapp on Mar. 21, 1989 and entitled "Animal Watering Fountain", an animal can actuate a lever in the basin which in turn opens a valve that then allows water to enter the basin. Any remaining water drains from the basin back into the underground tank.

By way of contrast to mechanically induced circulation systems described above, others operate on a natural convection principle. In these systems, e.g., as disclosed in U.S. Pat. No. 5,003,928, issued to Ketterlin on Apr. 2, 1991 and entitled "Freeze Resistant Animal Watering Installation", the top of the underground tank protrudes through the surface of the ground and serves as the drinking basin, while the bottom of the tank remains disposed below the frostline. Natural convection results by virtue of the temperature differential between the water at the top, which is relatively cooler because it is exposed to the air, and the water at the bottom of the tank, which is relatively warmer. Accordingly, water from the bottom of the tank rises to the top, cools, and returns to the bottom again in a cyclical fashion.

As shown in the prior art discussed above, e.g. U.S. Pat. No. 4,584,966, a reservoir can be disposed below the frostline, thereby preventing the water within it from freezing. Circumstances arise, however, in which the loss of heat from the drinking water supply above ground exceeds the amount of heat that can be transferred from the relatively warmer water in the reservoir disposed below ground on account of natural convection alone. In these situations, forced circulation provides additional heat transfer and further forestalls the freezing process. Even with the added forced circulation, however, the animals must often drink extremely cold water, i.e., water at a temperature just above the freezing point.

It would be advantageous to provide a system which would employ the principles of both induced circulation and natural convection to maintain the temperature of drinking water above freezing in the winter and below the ambient air temperature in the summer. Such a system would perform more effectively than one operating on either principle alone.

It would also be advantageous to provide a system which would provide greater assurances that the drinking water will remain free of debris and contamination during operation. In such a system, the drinking water which becomes subject to contamination after being exposed to the elements and animals is not recirculated for the purposes of transferring heat to the basin.

SUMMARY OF THE INVENTION

A recirculating livestock watering system is disclosed that features a reservoir having a bottom surface, a continuous side surface, and an upper rim surface. The reservoir is disposed such that the bottom surface and at least a portion of the continuous side surface lie underground. The system also features a water source disposed underground at a depth below the frost line and a heating circuit. The heating circuit includes a coil, a pump, an input valve, and a output valve. The coil has a coil inlet and a coil outlet and is disposed underground at depth below the frost line. The pump has a pump inlet and a pump outlet with the pump inlet being connected to the coil outlet and the pump outlet being connected to the coil inlet, to form a continuous enclosed path. The output valve releases water from the heating circuit into the reservoir upon demand and is disposed along the continuous enclosed path downstream from the coil outlet and upstream from the pump inlet. The input valve is connected to the water source and disposed along the continuous enclosed path upstream from the coil inlet and downstream from the pump outlet. The input valve permits water to enter and fill the heating circuit under predetermined conditions. At least a portion of the heating circuit passes through and transfers heat to the reservoir such that the system provides drinking water at a temperature above the freezing point during the winter and below the ambient air temperature during the summer.

The heating circuit can be configured to include a second coil (preferably at least forty feet in length) disposed within the reservoir along the continuous enclosed path downstream from the coil outlet and upstream from the outlet valve means. Insulation can be placed around the periphery of the reservoir. The input valve can be configured to prevent the flow of water from the heating circuit back into the water source. A float valve or similar device may be connected to the outlet valve means to register the change in depth of water within the reservoir and open the outlet valve means to allow the reservoir to fill once the depth drops below a predetermined level. The pump can be disposed within a remotely located pumping tank to allow an operator to access it and protect it from the elements. Preferably, the coil is at least fifty feet in length, one-half inch in internal diameter, and lies underground at a depth of at least four feet.

The recirculating livestock watering system can also be configured to include an agitation circuit. The agitation circuit includes an agitation pump, which has an agitation pump inlet and an agitation pump outlet. A feed line is connected to the agitation pump outlet and disposed to terminate near the interior side surface of the reservoir above its bottom surface. A return line is connected to the agitation pump inlet and disposed to terminate near the interior side surface of the reservoir above its bottom surface approximately opposite the feed line. The operation of the agitation pump causes water to flow out of the feed line and into the return line, such that the contents of the reservoir are disturbed and the freezing process inhibited.

Preferably, both the pump and the agitation pump can circulate water at a rate of at least five gallons per minute, the reservoir capacity is at least three hundred gallons, and the operating pressure within the heating circuit is at least 40 p.s.i.g. At least a portion of the heating circuit can be disposed within the reservoir in thermal communication with its contents such that the recirculating livestock watering system provides drinking water at a temperature above the freezing point during the winter and below the ambient air temperature during the summer.

BRIEF DESCRIPTION OF THE DRAWINGS

The advantages of the instant disclosure will become more apparent when read with the specification and the drawings, wherein.

DETAILED DESCRIPTION OF THE INVENTION

Figure 1:
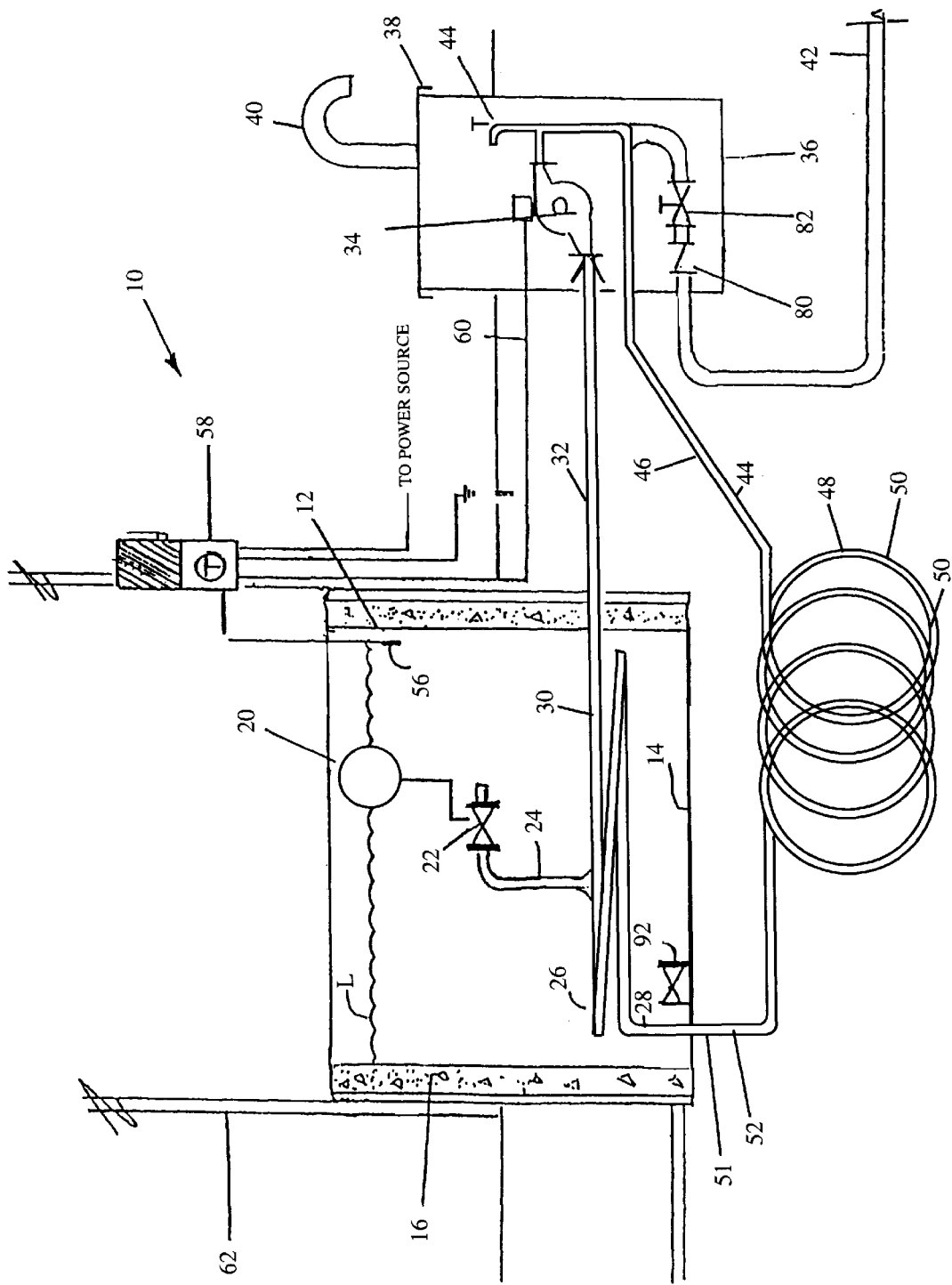
FIG. 1 depicts a side view of the recirculating watering system.

The care of livestock as presented a problem in winter due to the amount of water required by cows and/or horses. In order to maintain weight, and for overall health, large quantities of water must be consumed by these types of livestock. When the water becomes too cold, the amount of water consumed is reduced by the animal, thereby reducing the efficiency of food processing along the gut. It should be noted that the disclosed system has been tested on domestic livestock, however certain exotic breeds, for example lamas, may have different requirements and care taken with these breeds.

The temperature of water can be effectively heated to a greater extent through use of an extended length of relatively small diameter pipe disposed in a coil beneath the frost line, even when the ambient temperature decreases below 20° F. This result occurs even though the volume of water within the pipe is less than the volume of water available in the typical underground reservoir of the type disclosed in the prior art. For the purposes of illustration, if the reservoir was configured to have its length (L) equal to its diameter (d), then its surface area could be expressed as follows:

$SA = d^2/4 + (d)(L)$, but since $L = d$ $SA = d^2/2 + d^2 = 3\, d^2/2$

By way of contrast, the length of a pipe (L') having a diameter equal to one-twelfth the diameter of the reservoir (d/12) that would be required in order to yield an equivalent surface area could be solved for as follows:

$$SA = 3d^2/2$$

$$3d^2/2 = 2(d/12)^2/4 + (d/12)(L')$$
$$= d/288(d + 24L')$$

Solving for L', $L' = 431d/24 = 17.96d$

The respective interior volumes of the reservoir and the length of pipe can now be compared. The volume of the reservoir can be expressed $V_{res} = d^2(L)$, but since $L = d$ $V_{res} = d^3$ The volume of the length of pipe in similar terms is $V_{pipe} = (d/12)^2(L')$, but since $L' = 17.96d$ $V_{pipe} = d^3(17.96/144) = 0.12\, d^3$ Therefore, $V_{pipe} = 0.12\, V_{res}$ In other words, the volume of the typical reservoir could be as much as eight times larger than the volume of a pipe having a diameter only one-twelfth as great as the diameter of the reservoir, but an equivalent surface area. Consequently, the quantity of heat transferred from such a reservoir can be matched by using a length of pipe having a lower volume, and a corresponding lower material cost, than the reservoir. If this length of pipe is configured in a coil, it will occupy a volume less than or equal to that of the comparably performing reservoir.

With respect to most common heat exchanges, the heat transfer occurs between two moving fluids because the lower available heat transfer between stagnant fluids proves to be inefficient. Heat transfer between a solid and a fluid is also inefficient. With respect to this situation, in which the heat source for the heat transfer process is the heat from the earth, another problem arises because the earth's temperature is not substantially higher than the temperature of the ambient air (i.e., the heat sink in the process). Nonetheless, the surprising result is that a buried coil or length of pipe, situated below the frostline, can deliver sufficient heat to an above ground drinking water source in order to prevent it from freezing.

Significantly, the length of the pipe used is critical since the resulting heat transfer from an insufficient length will not result in better results than those achieved by using a buried reservoir. The heat exchange capacity of water flowing in a pipe is greater than the capacity of stagnant water in a reservoir on account of the more efficient heat transfer that occurs when a liquid flowing through a pipe enters the nonlaminar flow regime. Even so, it would appear that the relatively small volume of water available within a coil of a comparatively small diameter pipe would be insufficient to provide the quantity of heat required.

Equally significant as the effect of the coil to prevent the drinking source from freezing is the unexpected advantage that arises by raising the temperature of the water. It has been shown that cattle raised in an environment in which the drinking water supply is heated during the winter and cooled during the summer exhibit substantially improved overall health and growth. As evidence of this phenomenon, an increased rate of weight gain for cattle raised in such an environment, as contrasted with stream-fed cattle, has been observed. As compared to the system described in U.S. Pat. No. 4,584,966, the present invention not only provides increased assurances that temperature of the water will remain above the freezing point, but also that it will be maintained at a higher temperature during the winter and a lower temperature during the summer.

Another unexpected result arises with respect to choosing the material from which the pipe is formed. It has been found that the coil can be formed of a plastic material, e.g. PVC, polyethylene, polypropylene, etc., that can withstand temperatures near 0° F. The characteristic heat resistance of packed earth, within which the coil is surrounded, is four times greater than the heat resistance of typical copper pipe. Accordingly, the substitution of PVC pipe for copper pipe does not result in a significant loss of performance. Consequently, even in view of the slightly lower performance of plastic pipe, its lower cost, greater ease of handling, and greater durability, plastic piping might be a preferable material in some applications.

Referring to the drawings, and more particularly to FIG. 1, the recirculating watering system is shown generally, as indicated by reference numeral 10. A reservoir 12 is disposed to project partially above the surface of the ground with the reservoir bottom 14 sitting below the frostline. A drain 92 is situated near the reservoir bottom 14 to facilitate emptying the reservoir for periodic cleaning or service. The drain 92 also provide a means to empty the watering system 10 in the event the pastures are rotated and the system is only used part of the year. If left empty during periods of freezing the system must be winterized as will be known in the art. Insulation 16 lies adjacent to the vertical sides of the reservoir 12 to assist in further maintaining an above freezing temperature.

In the preferred embodiment, the reservoir 12 is configured in a generally cylindrical shape and manufacture from a weather and animal resistant material, such as precast concrete. In the preferred embodiment, the bottom surface 14 of the reservoir 12 sits approximately 32 inches below the surface with the top of the reservoir 12 protruding above the surface approximately 16 inches. Accordingly, the total height of the reservoir 12 is approximately 48 inches. The internal diameter of the reservoir 12 is also approximately 48 inches. Consequently, the capacity of the reservoir 12 in the preferred embodiment is approximately 376 gallons. The sides of the reservoir are approximately 7 inches thick. In the preferred embodiment, the insulation 16 is foam and the bottom surface of the reservoir 12 rests on packed soil.

The water level L in the reservoir 12 is maintained by a float mechanism 20. Once the water level L decreases below a predetermined lower point, the float mechanism 20 opens an inlet valve 22, allowing fresh water to refill the reservoir 12 until the water level L reaches a predetermined upper point. In the illustrated embodiment, the float mechanism 20 is a ball valve although a sensor of the type commonly used in sump pumps or other methods known in the art can also be used. The inlet valve 22 is connected to a reservoir supply line 24. The reservoir supply line 24 extends vertically upward from a reservoir coil 26. The reservoir coil 26, which comprises part of a heating circuit 44, is situated near the reservoir bottom 14. Preferably, the bottom loop of the reservoir coil 26 rests approximately four inches above the reservoir bottom 26 and has a length of about sixty feet. Water enters the reservoir coil 26 through a reservoir coil inlet 28 near one side of the reservoir 12, spirals upward, and exits through a reservoir coil outlet 30, generally disposed above and at the opposite side from the reservoir coil inlet 28. The reservoir coil outlet 30 is connected to a return line 32.

Water is drawn through the return line 32, which is situated below ground, by a pump 34 which is situated within a pumping tank 36. Although the periphery of the pumping tank 36 in the preferred embodiment is situated remotely from the center of the reservoir 12 at a distance of approximately 8 feet, the configuration and function of the pumping tank 36 could be incorporated with that of the reservoir 12. The pumping tank 36 extends below ground with the top of the pumping tank 36 slightly above ground level and covered by a lid 38. A vent 40 extends from the lid 38 to allow condensation which develops within the pumping tank 34 to escape, thus minimizing the potential for the pump 34 to short-circuit. The vent 40 can be connected to a vent line (not shown) to allow the vent 40 to protrude through the surface near the periphery of the reservoir 12. In the preferred embodiment, the pumping tank 36 is generally cylindrical, approximately 18 inches in diameter and 24 inches in height, and constructed of 3/16" thick fiberglass. A source line 42 also enters the pumping tank 36. In some instances, such as extremely large reservoirs or generator operated back-ups, dual pumps may be desired. The pumps can be housed together in one housing or separate in individual housings, dependent upon user's preference. It should also be noted that a single pump can operate more than one small reservoir, especially if placed centrally between the reservoirs. The placement of reservoirs to pumps, number of pumps required, etc., will become evident to those skilled in the art.

Water from from the source line 42 feeds the heating circuit 44 through a check valve 80. In the preferred embodiment, the source line 42 is buried at least three feet below the ground. Although flow from the source line 42 is pressurized, the check valve 80 further prevents any possible flow in a reverse direction in the event of an equipment failure upstream from the source line 42. In the preferred embodiment, water from the source line 42 enters at a pressure of approximately 50 p.s.i. Water flowing through the check valve 80 passes through a pressure reducing valve 82. The pressure reducing valve 82 allows pressure in excess of a specified safe operating level to escape.

The remaining portion of the heating circuit 44 extends from the pump 34 to the area underground and below the reservoir 12. The pump 34 forces water through a transition line 46, which passes through the side of the pumping tank 36 and continues underground to an area beneath the reservoir 12. The transition line connects to a ground coil 48. Water in the ground coil 48 spirals through loops 50, which are disposed in the vertical plane, and continues to flow through the remaining potion of the heating circuit 44. In the illustrated embodiment, the loops 50 of the ground coil 48 range from approximately sixteen to twenty inches in diameter, for a total extended length of about forty feet. Other coil configurations can also be utilized, such as drainfield style, and will become apparent to those skilled in the art. Preferably the ground coil 48 is buried at a depth of approximately eight feet in packed soil. At the ground coil end 52 of the ground coil 48, water flows through an extension line 54. The extension line 54 guides water vertically upward through the reservoir bottom 14 and connects with reservoir coil inlet 28, thereby completing heating circuit 44. In the preferred embodiment, the operating pressure within the heating circuit 44 is approximately 50 p.s.i.

A thermostatic sensor 56, disposed near the surface of the water in the reservoir 12, registers the temperature of the water. The thermostatic sensor 56 is connected to the thermostatic control mechanism 58. The thermostatic control mechanism 58 transmits the temperature of the water in the reservoir 12 to the pump 34 via a signal line 60, triggering the pump 34 to begin circulating. Both the design and operation of the thermostatic sensor 56 and the thermostatic control mechanism 58 are well known to those skilled in the art.

Figure 2:
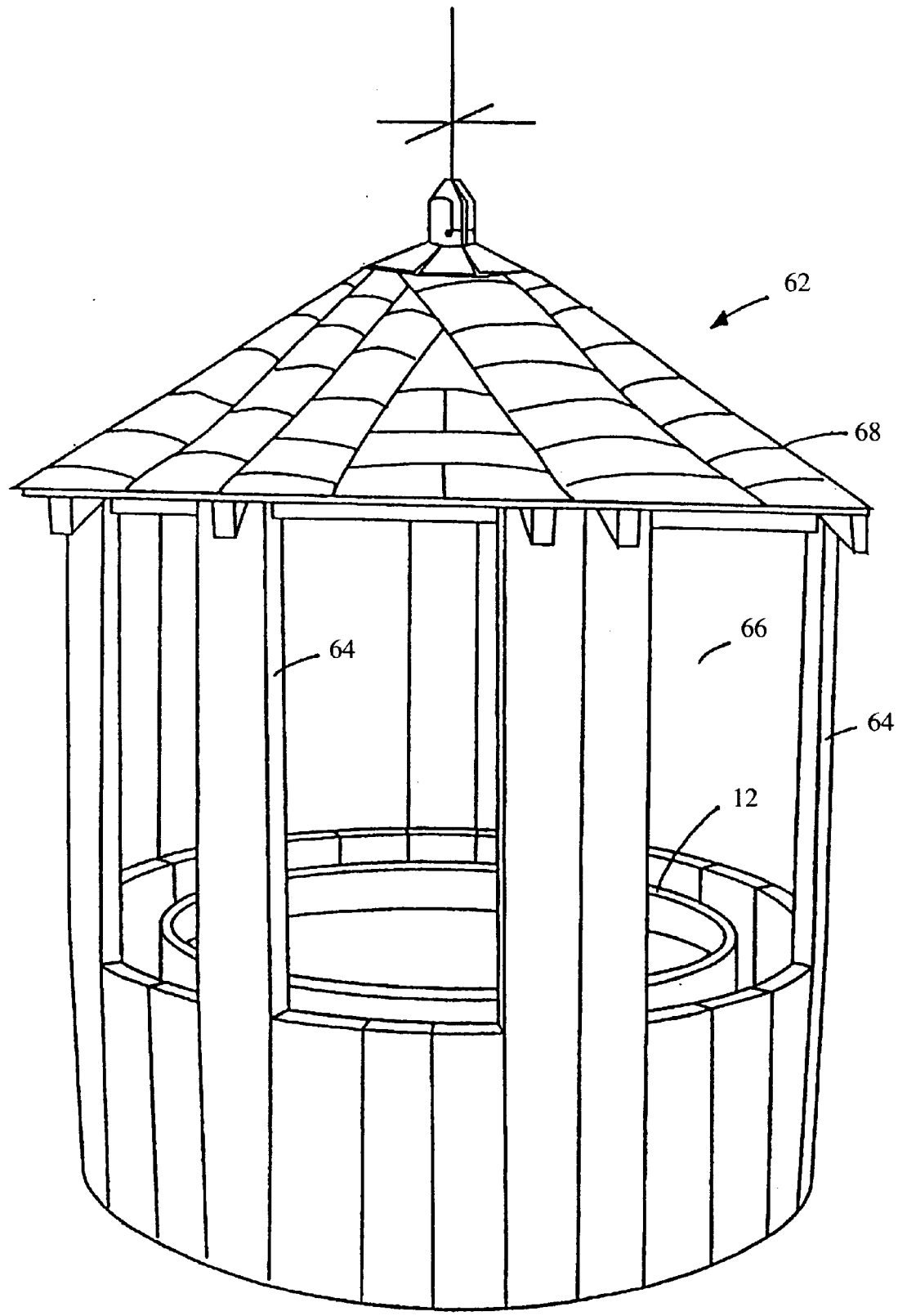
FIG. 2 depicts a pictorial view of the preferred embodiment of the enclosure for the reservoir.

As shown in FIG. 2, an enclosure 62 can be constructed to prevent debris from entering the reservoir 12 and to provide a more attractive overall appearance. The illustrated enclosure 62 resembles a traditional gazebo, however other designs can be incorporated. Vertical supports 64 create open areas 66 within the enclosure 62 and support a roof 68. These open areas 66 are sized to fit one adult animal, thus tending to keep a number of simultaneously feeding animals separated from one another. In the illustrated embodiment, nine vertical supports 64 create nine corresponding open areas 66, thus allowing nine animals to drink simultaneously. In areas prone to severe weather conditions, wind-resistant portal covers can be used to cover a portion of the the open areas 66. Since grazing animals will attempt to feed on almost anything, the enclosure 62 is configured in a generally cylindrical shape which minimizes the number of protuberances (e.g., corners) subject to this predisposition. Because the enclosure 62 must withstand severe weather, it is constructed of salt-treated boards or other suitable material. The roof 68 is covered with asphalt shingles or equivalent material.

Figure 3:
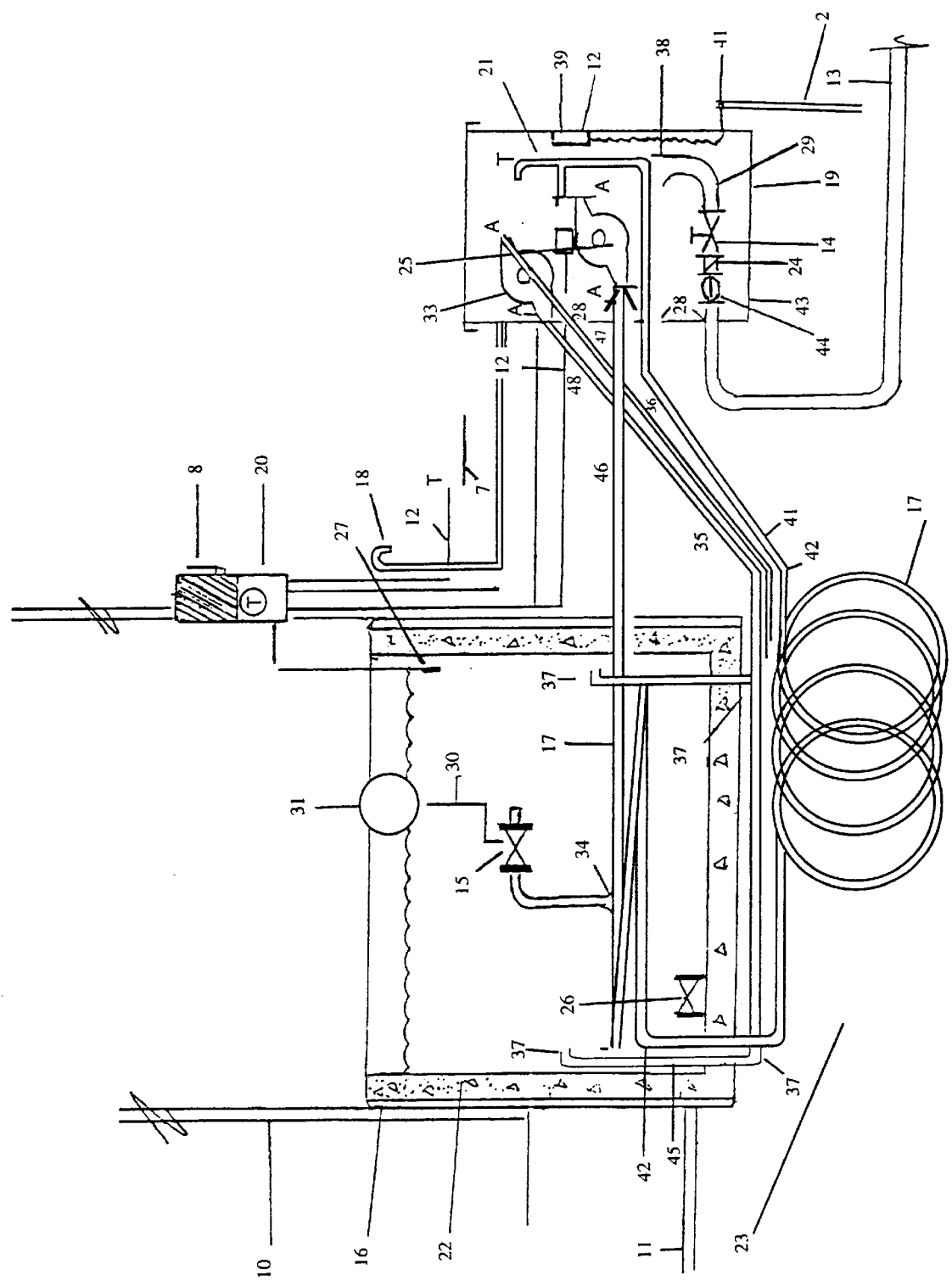
FIG. 3 depicts a side view of an alternative embodiment of the recirculating watering system, illustrating an additional agitation circuit.

An alternative embodiment of the present invention is shown in FIG. 3. This embodiment additionally features an agitation circuit 70. In extremely cold climates, the agitation circuit 70 accelerates the cyclical "turning over" of the water during the natural convection process described above, thereby providing an additional safeguard against freezing. The agitation circuit 70 includes an agitation pump 72 placed within the pumping tank 36. The agitation pump 72 forces water through an agitation supply line 74. The agitation supply line 74 passes out through a side of the pumping tank 36, extends beneath the surface of the ground, and enters the reservoir 12 by passing through the reservoir bottom 14. At the opposite side of the reservoir 12, water flows into a agitation return line 76, which extends downward and passes through the reservoir bottom 14, and continues underground to the pumping tank 36. The agitation return line 76 passes through the pumping tank and connects with the agitation pump 72, thus completing the agitation circuit 70. In the alternative embodiment, the outlet of the agitation supply line 74 and the inlet of the agitation return line 76 extend approximately eighteen inches above the reservoir bottom 14. Preferably the inlet is provided with a screen to prevent debris from entering, and subsequently clogging, the agitation system.

By virtue of being disposed in the pumping tank 36, separate and apart from the reservoir 12, both the pump 34 and the agitation pump 72, as well as other critical moving components, (e.g. the check valve 80 and the pressure reducing valve 82) are readily accessible for servicing. In addition, a heating circuit check valve 94 is disposed within the pumping tank 36 along the heating circuit 44. Moreover, animals drinking from the reservoir 12 remain free from the hazards of electrical shocks that could result if submersible pumps disposed within the reservoir were used.

Since the thermal resistance of packed earth exceeds the thermal resistance of copper by a factor of approximately four, choosing a piping material based upon its conductivity becomes inconsequential. Accordingly, the use of a less conductive (and less expensive) material than copper, e.g. PVC, will not result in a significant difference in overall performance of the system. In the preferred embodiment, 3/4" O.D. pipe is used. All pipe joints and connections are conventional and well known to those skilled in the art. All lines running between the reservoir 12 and the pumping tank 36 should be surrounded by insulation to minimize heat loss.

From the standpoint of design, determining the required length of the ground coil 40 was supported by a heat transfer analysis, as well as actual testing. Since this analysis suggested that winter conditions posed the more stringent requirements, only the system's warming functions are discussed herein. Foremost, the analysis proceeded upon the geometrical constraints described above and the requirement that the minimum water temperature in the reservoir (the minimum bulk reservoir temperature) must be 34° F. in order for the water to be sufficiently free from ice. To simulate a worst case scenario, the effect of a constant 10 m.p.h. wind was assumed to be present. Furthermore, it was assumed that the reservoir did not undergo a refilling over the course of the day.

First, the greatest heat transfer from the reservoir 12 occurs by convection from the air/water interface at the upper surface. Second, smaller conduction and convection losses occur, respectively, through and at the above-ground portions of the periphery of the reservoir 12. Similar conduction losses occur through the below-ground portion and the reservoir bottom 14. These losses may be calculated through use of a sinusoidal model for ambient and subground temperatures. Using this model further requires specifying the amplitude of the annual temperature swing and on which day of the year the minimum surface temperature occurs.

To simulate an extreme northern climate, an annual temperature swing of 30° F. and the occurrence of the minimum surface temperature on the forty-first day of the year were used. Based on this criteria, the required length of the ground coil 40 was judged to be approximately 52 feet. If an annual temperature swing of 25° F., representing the Middle Atlantic states climate, were used, the required length of the ground coil 40 would be approximately 21 feet.

Listed below (TEST DATA, pp. 17–18) are actual temperature data and comments relating to the conditions observed at a central Virginia location with respect to the operation of the recirculating watering system 10 during a severe winter. The configuration of the recirculating watering system 10 as tested substantially matched the description of the preferred embodiment as described earlier in this section (e.g., the coil was constructed of ¾" O.D. copper pipe). Significantly, however, the return line 32 and the transition line 46 were not insulated, the ground coil 40 was disposed in a gravel bed rather than packed earth, and the length of the ground coil 40 was approximately forty rather than sixty feet. Because these circumstances reflect deviations from the requirements of the preferred embodiment, somewhat lower overall performance was observed than could be expected from strictly adhering to the requirements of the preferred embodiment.

On account of the particularly severe weather conditions reflected by the data, the threshold capacity of the recirculating watering system can be ascertained. Although the notes with respect to the observed conditions report that the reservoir surface became frozen, in most instances the resulting layer of ice either incompletely covered the surface or was sufficiently thin to be easily broken. In addition, the data reflect the effect of high velocity winds on lowering the overall performance of the recirculating watering system 10. This effect could be lessened by lowering the normal water level L in or providing a cover over the reservoir 12. In view of the above, the recirculating watering system 10 of the preferred embodiment would appear to provide a sufficiently ice-free water source even during sustained temperatures as low as approximately 15° F.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. A recirculating livestock watering system, comprising:
   a reservoir having a bottom surface, a continuous side surface, and an upper rim surface, said reservoir being disposed such that said bottom surface and at least a portion of said continuous side surface are underground;
   a water source disposed underground at a depth below the frost line; and
   a heating circuit, said heating circuit comprising:
      a coil having a coil inlet and a coil outlet, said coil being disposed underground at depth below the frost line,
      at least one pump having a pump inlet and a pump outlet, said pump inlet being connected to said coil outlet, said pump outlet being connected to said coil inlet, thereby forming a continuous enclosed path,
      an inlet valve means, said output valve means being disposed along said continuous enclosed path downstream from said coil outlet and upstream from said pump inlet, said inlet valve means releasing water from said heating circuit into said reservoir upon demand, and
      an input valve means, said input valve means being connected to said water source and disposed along said continuous enclosed path upstream from said coil inlet and downstream from said pump outlet, said input valve means permitting water to enter and fill said heating circuit under predetermined conditions;
   wherein at least a portion of said heating circuit is disposed within said reservoir in thermal communication with contents of said reservoir such that said recirculating livestock watering system provides drinking water at a temperature above the freezing point during the winter and below the ambient air temperature during the summer.

2. The recirculating livestock watering system as described in claim 1, wherein said heating circuit further comprises a second coil, said second coil being disposed within said reservoir, along said continuous enclosed path, downstream from said coil outlet, and upstream from said outlet valve means.

3. The recirculating livestock watering system as described in claim 2, wherein the length of said second coil is at least approximately forty feet.

4. The recirculating livestock watering system as described in claim 1, wherein insulation is disposed to surround the periphery of said continuous side surface of said reservoir.

5. The recirculating livestock watering system as described in claim 1, wherein said input valve means prevents the flow of water from said heating circuit into said water source.

6. The recirculating livestock watering system as described in claim 1, further comprising a float valve, said float valve being connected to said outlet valve means and disposed to float on the surface of, and register the change in depth of, water within said reservoir, such that a predetermined decrease in said depth beyond a certain point creates said demand and said outlet valve means opens to fill said reservoir.

7. The recirculating livestock watering system as described in claim 1, wherein said pump is disposed within a pumping tank, said pumping tank being disposed remotely from said reservoir and allowing access to said pump, said pumping tank being configured to protect said pump from adverse weather conditions.

8. The recirculating livestock watering system as described in claim 1, wherein the length of said coil equals or exceeds approximately fifty feet.

9. The recirculating livestock watering system as described in claim 8, wherein the internal diameter of said coil equals or exceeds approximately one half inch.

10. The recirculating livestock watering system as described in claim 1, wherein said coil lies underground at a depth of at least approximately two and one half feet.

11. The recirculating livestock watering system as described in claim 1, further comprising an agitation circuit, said agitation circuit comprising:

an agitation pump having an agitation pump inlet and an agitation pump outlet;

a feed line, said feed line being connected to said agitation pump outlet and disposed to terminate near the interior side surface of said reservoir above said bottom surface; and a return line, said return line being connected to said agitation pump inlet and disposed to terminate near the interior side surface of said reservoir above said bottom surface approximately opposite said feed line, wherein the operation of said agitation pump causes water to flow out of said feed line and into said return line, such that the contents of said reservoir are disturbed an the freezing process is inhibited.

12. The recirculating livestock watering system as described in claim 1, wherein said pump can circulate at a rate of at least approximately five gallons per minute.

13. The recirculating livestock watering system as described in claim 1, wherein the capacity of said reservoir is at least approximately three hundred gallons.

14. The recirculating livestock watering system as described in claim 1, wherein water from said water source enters said heating circuit through said input valve means at a pressure of at least approximately 40 p.s.i.g.

15. The recirculating livestock watering system as described in claim 1, wherein said coil is pipe constructed of plastic having an uncoiled length of at least approximately 40 feet and an external diameter within the range from approximately one-half inch to one inch.

16. The recirculating livestock watering system as described in claim 15, wherein said plastic is selected from the group consisting of PVC polymers and olefin polymers.

17. The recirculating livestock watering system as described in claim 16, wherein said plastic is selected from the group consisting of polyvinyl chloride, polyethylene, and polypropylene.

18. A recirculating livestock watering system, comprising:

a reservoir having a bottom surface, a continuous side surface, and an upper rim surface, said reservoir being disposed such that said bottom surface and at least a portion of said continuous side surface are underground, the capacity of said reservoir being at least approximately three hundred gallons;

a water source disposed underground at a depth below the frost line; and a heating circuit, said heating circuit comprising:

a coil having a coil inlet and a coil outlet, said coil being disposed underground at depth of at least approximately eight feet;

a pump having a pump inlet and a pump outlet, said pump inlet being connected to said coil outlet, said pump outlet being connected to said coil inlet, thereby forming a continuous enclosed path, an inlet valve means, said output valve means being disposed along said continuous enclosed path downstream from said coil outlet and upstream from said pump inlet, said inlet valve means releasing water from said heating circuit into said reservoir upon demand, and an input valve means, said input valve means being connected to said water source and disposed along said continuous enclosed path upstream from said coil inlet and downstream from said pump outlet, said input valve means permitting water to enter and fill said heating circuit under predetermined conditions;

wherein at least a portion of said heating circuit is disposed within said reservoir in thermal communication with contents of said reservoir such that said recirculating livestock watering system provides drinking water at a temperature above the freezing point during the winter and below the ambient air temperature during the summer.

* * * * *